(12) United States Patent
Hirth et al.

(10) Patent No.: US 8,505,965 B2
(45) Date of Patent: Aug. 13, 2013

(54) VEHICLE OCCUPANT SAFETY SYSTEM WITH ENERGY-ABSORBING ELEMENTS, AND METHOD OF OPERATING SAME

(75) Inventors: Andreas Hirth, Dielheim (DE); Lutz Quarg, Boeblingen (DE); Friedrich Reiter, Sindelfingen (DE); Clark Ruedebusch, Holzgerlingen (DE)

(73) Assignee: Daimler AG, Stuttgart (DE)

( * ) Notice: Subject to any disclaimer, the term of this patent is extended or adjusted under 35 U.S.C. 154(b) by 342 days.

(21) Appl. No.: 12/740,656

(22) PCT Filed: Oct. 30, 2008

(86) PCT No.: PCT/EP2008/009155
§ 371 (c)(1),
(2), (4) Date: Apr. 29, 2010

(87) PCT Pub. No.: WO2009/056307
PCT Pub. Date: May 7, 2009

(65) Prior Publication Data
US 2010/0237594 A1    Sep. 23, 2010

(30) Foreign Application Priority Data

Nov. 2, 2007  (DE) .......................... 10 2007 052 247
Aug. 14, 2008  (DE) .......................... 10 2008 037 810

(51) Int. Cl.
*B60R 21/233*    (2006.01)
(52) U.S. Cl.
USPC ....................... 280/730.1; 280/743.1; 280/729
(58) Field of Classification Search
USPC ..................................... 280/729, 730.1, 743.1
IPC ........................................................ B70R 21/233
See application file for complete search history.

(56) References Cited

U.S. PATENT DOCUMENTS

| 3,907,327 | A | * | 9/1975 | Pech | 280/729 |
| 3,929,350 | A | * | 12/1975 | Pech | 280/729 |
| 3,960,386 | A | * | 6/1976 | Wallsten | 280/731 |

(Continued)

FOREIGN PATENT DOCUMENTS

| CA | 2 584 099 A1 | 10/2007 |
| EP | 1 364 840 A1 | 11/2003 |

(Continued)

OTHER PUBLICATIONS

International Search Report including English partial translation dated Feb. 5, 2009 and PCT/ISA/237 Form (Thirteen (13) pages).

*Primary Examiner* — Ruth Ilan
(74) *Attorney, Agent, or Firm* — Crowell & Moring LLP

(57) ABSTRACT

A vehicle occupant restraint system has an airbag, which provides a predetermined support force distribution in the filled (unfolded) state, and at least one energy-absorbing element that is attached to the airbag in order to unfold it or to locally increase the support force thereof. The energy-absorbing element(s) are arranged such that at least one energy absorbing element may apply itself to an occupant, and may at least partially follow the movements of the same at least to a certain extent. The energy-absorbing element has an occupant-protective function, and/or the airbag has a funnel function relative to an occupant to be supported. The occupant is guided toward the center of the airbag during an impact by means of the funnel function, and is possibly also protected laterally by means of the side walls.

11 Claims, 2 Drawing Sheets

(56) References Cited

U.S. PATENT DOCUMENTS

| | | | |
|---|---|---|---|
| 3,970,328 A | | 7/1976 | Wallsten |
| 4,076,277 A | | 2/1978 | Kuwakado et al. |
| 4,500,114 A | * | 2/1985 | Grey, Jr. .................. 280/742 |
| 5,372,381 A | * | 12/1994 | Herridge .................. 280/743.1 |
| 5,542,695 A | * | 8/1996 | Hanson .................... 280/729 |
| 5,618,595 A | * | 4/1997 | Matsushima et al. ........ 428/35.2 |
| 6,419,262 B1 | * | 7/2002 | Fendt et al. ............... 280/729 |
| 6,913,283 B2 | | 7/2005 | Heym |
| 7,347,445 B2 | * | 3/2008 | Choi ....................... 280/729 |
| 7,503,583 B2 | * | 3/2009 | Muller ..................... 280/743.1 |
| 7,900,961 B2 | | 3/2011 | Hanawa et al. |
| 2004/0164526 A1 | * | 8/2004 | Hasebe et al. .............. 280/729 |
| 2004/0174003 A1 | | 9/2004 | Dominissini |
| 2005/0098994 A1 | | 5/2005 | Matsumura |
| 2006/0163848 A1 | * | 7/2006 | Abe ........................ 280/729 |
| 2006/0197318 A1 | * | 9/2006 | Choi et al. ................ 280/729 |
| 2007/0205591 A1 | | 9/2007 | Bito |

FOREIGN PATENT DOCUMENTS

| | | | |
|---|---|---|---|
| JP | 6-1014 U | | 1/1994 |
| JP | 2005-162195 A | | 6/2005 |
| JP | 2006-341780 A | | 12/2006 |
| JP | 2007-55501 A | | 3/2007 |
| JP | 2007-106376 A | * | 4/2007 |
| JP | 2007-230501 A | | 9/2007 |
| JP | 2007-276771 A | | 10/2007 |

* cited by examiner

VEHICLE OCCUPANT SAFETY SYSTEM WITH ENERGY-ABSORBING ELEMENTS, AND METHOD OF OPERATING SAME

This application is a national stage of PCT International Application No. PCT/EP2008/009155, filed Oct. 30, 2008, which claims priority under 35 U.S.C. §119 to German Patent Application No. 10 2007 052 247.0, filed Nov. 2, 2007 and No. 10 2008 037 810.0, filed Aug. 14, 2008, the entire disclosures of which are herein expressly incorporated by reference.

BACKGROUND AND SUMMARY OF THE INVENTION

The present invention relates to a vehicle occupant safety system with an airbag, which has a predetermined support force distribution in the filled or unfolded state, and with one or more energy-absorbing elements, which are attached to the airbag to unfold it and/or to increase its support force locally. The invention also relates to a method for supporting an occupant during an impact of the vehicle by filling and/or unfolding a airbag, so that it has a predetermined support force distribution.

The protective effect of airbags can be reduced if an occupant to be protected impacts it other than centrally. An airbag can additionally also be pushed through by the occupant with an especially high accident severity or with a diagonal impact, so that no further damping gas is available between the occupant and hard impact parts. Such problems occur with all known types of airbags.

Conventional airbags are filled by a gas generator during an impact of the vehicle. In addition, so-called "window bags" are known, which are rigidly mounted to the windows of a vehicle and have tubes filled with gas. Furthermore, mechanical airbags are known, which unfold in a purely mechanical manner with the help of a spring force. Moreover, so-called "support structure airbags" have been developed, whose support structure can be moved from a storage position to a restraint position by means of a gas flow. A plurality of hollow bodies connected to each other, forming a channel system, are filled by a targeted influencing of the gas flow. Together with the unfolding, the restraint volume limited by the support structure or the covering mounted therebetween is mounted, which is usually filled with the ambient air at an ambient pressure.

One object of the present invention is to provide an occupant safety system where the protective effect is improved in the case of a diagonal impact or of a person not sitting centrally in front of an airbag.

This and other objects and advantages are achieved by the vehicle occupant safety system according to the invention, which includes an airbag with a predetermined support force distribution in the filled or unfolded state, and at least one energy-absorbing element that is attached to the airbag in order to unfold it and/or to increase its support force locally. The at least one energy-absorbing element is arranged in such a manner that the airbag has a funnel function with regard to an occupant to be supported and/or that the at least one energy-absorbing element is designed to be applied to an occupant and to at least partially following his movements, so as to exert an additional occupant-protecting function.

The invention also provides a method for supporting an occupant during an impact of a vehicle, by filling and/or unfolding an airbag in such a manner that it has a predetermined supporting force distribution, and guiding the occupant during the impact to a predetermined destination. The support force depending on the position obtains a component in the direction of the predetermined destination in a predetermined region of the airbag by means of one or more energy-absorbing elements and/or by applying at least one energy-absorbing element of the airbag to an applicant, which is designed to follow his movements at least partially, so as to exert an additional occupant-protecting function.

In an advantageous manner, the occupant is guided to the airbag at a predetermined destination by means of the funnel function or the specific support force distribution when impacting. The safety of the restraint system is increased thereby, as a pushing through of the airbag can be avoided in most cases in a targeted manner.

The at least one energy-absorbing element can have a foam rod or a foam bead. Thereby, the danger of pushing through can be reduced at critical locations.

According to a preferred embodiment, the energy-absorbing element has one or more gas-filled tubes. They are also suitable to give the airbag a shape which is suitable for the function.

The at least one energy-absorbing element can especially form a structure adapted to a human body. It can thereby be avoided that individual parts of the human body are strained excessively during the impact. The energy-absorbing elements preferably form a keyhole edge-like shape in the main impact region. The body of an occupant thereby impacts an evenly mounted surface during the impact, which can improve the occupant kinematics during the restraint.

It is provided according to a further embodiment that the at least one energy-absorbing element projects from the airbag for its support at a vehicle interior surface. Several of the energy-absorbing elements can naturally also project from the airbag for the support. It can e.g. be prevented by means of this additional support that the restraint system cannot fulfill its funnel function any longer during a diagonal impact.

Further, the energy-absorbing element(s) can form a tapering structure in the main impact direction. Cylindrical elements can for example be arranged in a V-shaped manner. Such a structure then provides that the occupant is increasingly guided in the direction of the center of V shape during his forward dislocation. This also results in that the airbag also encloses the occupant laterally to an essential part and thus takes on a helmet or protective suit function, especially if at least one energy-absorbing element is applied to the occupant and can partially follow his movements.

The airbag can in particular be part of a support structure airbag or of a mechanical airbag. The gas-filled tubes or the mechanical support elements and/or at least one additionally applied energy-absorbing or supporting element are thereby arranged in such a manner that they enable the funnel function and/or also the helmet and protective suit function.

Other objects, advantages and novel features of the present invention will become apparent from the following detailed description of the invention when considered in conjunction with the accompanying drawings.

DETAILED DESCRIPTION OF THE DRAWINGS

The embodiments described in more detail in the following represent preferred embodiments of the present invention.

The vehicle occupant safety system according to the invention is in particular explained in more detail by means of a support structure airbag. The invention can however also be applied to mechanical airbags with rods and springs and to conventional airbags with segmented regions.

The present invention is generally based on the idea to provide energy-absorbing elements at an airbag covering or a gas bag. These energy-absorbing elements are arranged in such a manner that they effect a "capture" or beneficial positioning of a body to be restrained (e.g., occupant), and thus fulfill a type of funnel function. Lateral sections of the restraint system including the airbag and the energy-absorbing elements (referred to as an airbag in the following) can additionally abut the body to be protected in a targeted manner and thus fulfill a helmet function or a protective suit function.

Figure 1:
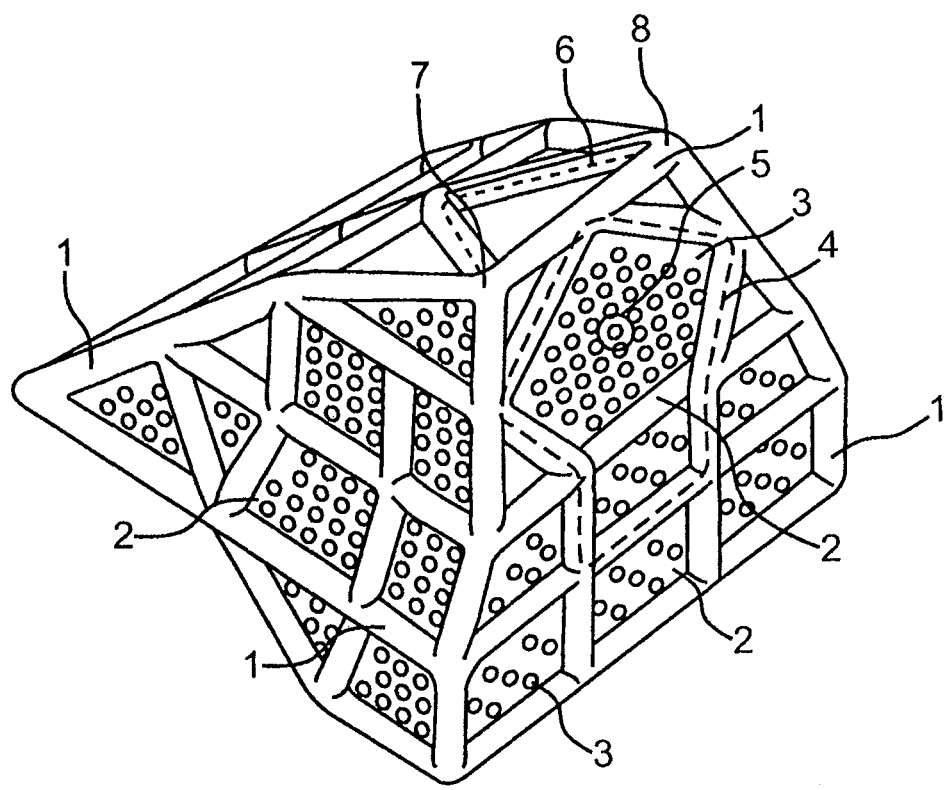
FIG. 1 is a perspective view of a support structure airbag with a funnel and/or protective suit function.

FIG. 1 shows an unfolded support structure airbag in its completely unfolded restraint position. The support structure is created by a plurality of hollow bodies 1 connected to each other, forming a channel system. The hollow bodies 1 are designed as hose-type tube bodies here, which are connected to each other as a framework-type or frame-type channel system. The hollow bodies 1 thereby presently consist of a flexible hose material to be filled with gas.

By means of the hollow bodies 1 connected to each other in a framework manner, individual compartments of the support structure are thus created, which are filled by planar elements made of a flexible material, for example a cloth or a rubber material. The planar elements 2 altogether form a covering, by means of which a restraint volume enclosed by the support structure is enclosed. The planar elements 2 have inflow and outflow openings 3, through which ambient air flows in during the unfolding and flows out in a targeted manner during a load.

The individual hollow bodies 1 are connected to a gas generator, by means of which a gas flow can be generated in the case of a collision of the motor vehicle, which flows into the channel system of the support structure. Simultaneously therewith, the restraint volume limited by the support structure or the covering is mounted thereby, which is here filled with ambient air, which is present at ambient pressure. The planar elements 2 thus form an airbag, which is mounted by the support structure.

In the present example the energy-absorbing elements serving as hollow bodies 1 are arranged in the shape of a keyhole edge 4 in the center region of the airbag or the airbag. This shape is illustrated in FIG. 1 by a dashed line. The individual hollow bodies 1 filled with gas have an increased stiffness relative to their direct environment. The airbag is thus slightly more resilient in the region of the planar elements 2 than directly at the hollow bodies 1. A funnel function thus results in the center region of the airbag due to the keyhole edge shape 4. If the occupant impacts for example the keyhole edge 4 with his head in the region of the hollow bodies 1, he is guided into the more resilient center 5 in the center of the keyhole edge shape 4. This can be explained in that the support force is higher in the vicinity or directly on the hollow bodies 1 than the support force of the planar elements 2, and thus a gradient directed towards the center 5 results. The support force is the lowest in the center 5, such that the impacting body is guided or displaced there according to the function of a funnel.

The funnel function can be reinforced further by a suitable arrangement of the hollow bodies 1. In the example of FIG. 1, two tubular hollow bodies 1 are arranged in a V shape, as illustrated in with a dotted line 6. The upper edges 7 and 8 of the airbag are especially supported better in the drive or impact direction, so that they keep their position better during an impact. The center region of the tubular hollow body 1, which connects the two edge points 7 and 8, will bend easier, whereby the funnel function of the keyhole edge shape 4 is reinforced further.

Figure 2:
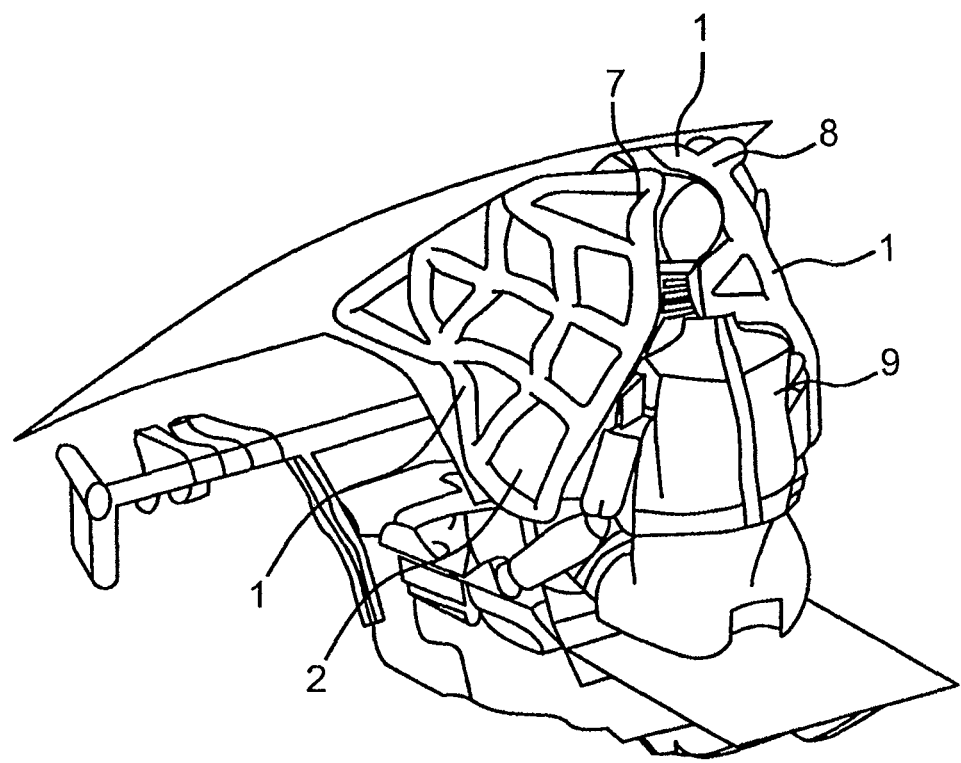
FIG. 2 shows the impact of a dummy on the airbag of FIG. 1.

FIG. 2 shows a dummy impacting the fully unfolded support structure airbag. At the time of maximum acceleration, the dummy is immersed the most into the airbag. It can be seen that the side walls of the airbag keep their shape in a relatively good manner at the left and the right side of the dummy 9. They thus also protect the dummy 9 or the occupant from the side during the impact. Thereby, a helmet function results in the region of the head, and a protective suit function in the region of the upper body.

The funnel and the protective suit function can both be implemented on their own (also without the other one). The use of both (e.g., funnel function for the targeted application of the protective elements) can be advantageous, but is not necessary.

It can especially be seen in FIG. 2, that the edges 7 and 8 almost keep their position in the drive direction, but that the hollow body 1 therebetween is however bent. The funnel function is thereby apparent.

Even if the occupant does not sit centrally in front of the airbag, he is guided to the center 5 of the airbag by means of the funnel function. However, this assumes that the airbag or the support structure of the airbag is supported at suitable surfaces of the vehicle interior.

In the present case, the side walls on the left and right of the airbag form for example relatively stable structures, such that the occupant experiences an increased support force from there and is correspondingly guided to the center of the airbag. The airbag can be dimensioned in such a manner or have further energy-absorbing elements, with which it is for example supported at window panes, pillars, the dashboard of the vehicle or similar. It is ensured thereby that the airbag can exert guiding forces on the impacting occupant and that the energy-absorbing elements can for example be applied to the head to be protected in a targeted manner.

The funnel function can for example also be achieved by segmented regions of the airbag. The segmented regions apply different support forces depending on the design, so as to guide the occupant correspondingly and to receive energy in a predetermined manner as energy-absorbing elements.

The funnel function can further also be achieved for example by one or several rebound straps, which constrict the airbag or the airbag at specific locations. The funnel function can be changed adaptively by the release of the rebound straps or of the rebound strap according to the situation. This means that the support forces are changed in dependence on the situation and thus the direction into which the occupant is to be guided, in a certain measure specific to the impact.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:
1. A vehicle occupant safety system, comprising:
An airbag which has a predetermined support force distribution in a filled unfolded state; and
at least one energy-absorbing element attached to the airbag, for at least one of unfolding the airbag and increasing its support force locally;

wherein the airbag has a support force that is lowest in a central portion of the airbag such that the airbag has a funneling function with regard to an occupant to be supported, and the at least one energy-absorbing element is configured for application to an occupant to at least partially follow his or her movements, so as to exert an additional occupant-protecting function; and wherein the at least one energy-absorbing element is configured in a keyhole shape in a central impact region of the airbag.

2. The vehicle occupant safety system according to claim 1, wherein the at least one energy-absorbing element has foam rods or foam beads.

3. The vehicle occupant safety system according to claim 1, wherein the at least one energy-absorbing element has at least one gas-filled tube.

4. The vehicle occupant safety system according to claim 1, wherein the at least one energy absorbing element forms a structure that is adapted to a human body.

5. The vehicle occupant safety system according to claim 1, wherein the at least one energy-absorbing element projects from the airbag for its support at an inner surface of the vehicle.

6. The vehicle occupant safety system according to claim 1, wherein the at least one energy-absorbing element forms a tapering structure in a central impact region of the airbag.

7. The vehicle occupant safety system according to claim 1, wherein the airbag is part of one of a support structure airbag and a mechanical airbag.

8. A method for supporting an occupant during an impact of a vehicle, said method comprising:

deploying an airbag, so that it has a predetermined support force distribution; and guiding the occupant to a predetermined destination during the impact, in that at least one energy-absorbing element exerts a location-dependent support force that includes a component in the direction of the predetermined destination in a predetermined region of the airbag;

wherein the airbag has a support force that is lowest in a central portion of the airbag such that the airbag has a funneling function with regard to the occupant; and wherein the at least one energy-absorbing element is configured in a keyhole shape in a central impact region of the airbag.

9. The method according to claim 8, wherein the at least one energy-absorbing element encloses the occupant to an essential part also laterally during an impact.

10. A method for supporting an occupant during an impact of a vehicle, said method comprising:

deploying an airbag, so that it has a predetermined support force distribution; and guiding the occupant to a predetermined destination during the impact, by applying at least one energy-absorbing element of the airbag to an occupant, which energy-absorbing element is at least partially configured for following his or her movements, so as to exert an additional occupant-protecting function;

wherein the airbag has a support force that is lowest in a central portion of the airbag such that the airbag has a funneling function with regard to the occupant; and wherein the at least one energy-absorbing element is configured in a keyhole shape in a central impact region of the airbag.

11. The method according to claim 10, wherein the at least one energy-absorbing element encloses the occupant to an essential part also laterally during an impact.

* * * * *